(12) United States Patent
Stieff

(10) Patent No.: US 6,313,911 B1
(45) Date of Patent: *Nov. 6, 2001

(54) VEHICLE ALIGNMENT SENSOR SYSTEM

(75) Inventor: Michael T. Stieff, Wentzville, MO (US)

(73) Assignee: Hunter Engineering Co., Bridgeton, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,423

(22) Filed: Nov. 2, 1998

(51) Int. Cl.$^7$ .............................. G01B 11/26; G01B 5/24; G01B 5/255
(52) U.S. Cl. .................................. 356/139.09; 33/203.12; 33/288
(58) Field of Search ............................. 33/203.12–203.18; 356/139.09

(56) References Cited

U.S. PATENT DOCUMENTS

| | | | |
|---|---|---|---|
| Re. 33,144 | * | 1/1990 | Hunter et al. . |
| 4,319,838 | | 3/1982 | Grossman et al. . |
| 4,402,603 | * | 9/1983 | Lill . |
| 4,672,562 | | 6/1987 | Egli et al. . |
| 4,672,564 | | 6/1987 | Egli et al. . |
| 4,879,670 | | 11/1989 | Colarelli, III . |
| 5,208,647 | * | 5/1993 | Longa et al. . |
| 5,220,399 | * | 6/1993 | Christian et al. . |
| 5,488,471 | * | 1/1996 | McClenahan et al. ......... 356/139.09 |
| 5,488,472 | * | 1/1996 | January ............................. 356/139.09 |
| 5,519,488 | * | 5/1996 | Dale, Jr. et al. ................. 356/139.09 |
| 5,535,522 | | 7/1996 | Jackson . |
| 5,589,927 | * | 12/1996 | Corghi ................................ 356/3.12 |
| 5,675,515 | | 10/1997 | January . |

OTHER PUBLICATIONS

SAE Technical Paper Series—Steering Geometry and Caster Measurement (850219).

* cited by examiner

Primary Examiner—Stephen C. Buczinski
(74) Attorney, Agent, or Firm—Polster, Lieder, Woodruff & Lucchesi, LC

(57) ABSTRACT

A vehicle alignment sensor system includes a first sensor assembly for measuring at least a first angle with respect to a fixed reference, that angle being related in a predetermined manner to an alignment angle of a vehicle whose alignment is to be measured, and a second sensor assembly for mounting in a known geometrical relationship to a wheel of a vehicle whose alignment is to be measured. The first sensor assembly has at least one detector, and the second sensor assembly has at least a pair of emitters in fixed geometrical relationship with respect to each other. The detector is capable of measuring the apparent geometrical relationship of the pair of emitters to determine a relative alignment angle of the vehicle, so that a true alignment angle of the vehicle is determinable from the first angle and the relative alignment angle. A calibration method using the present system is also disclosed.

8 Claims, 7 Drawing Sheets

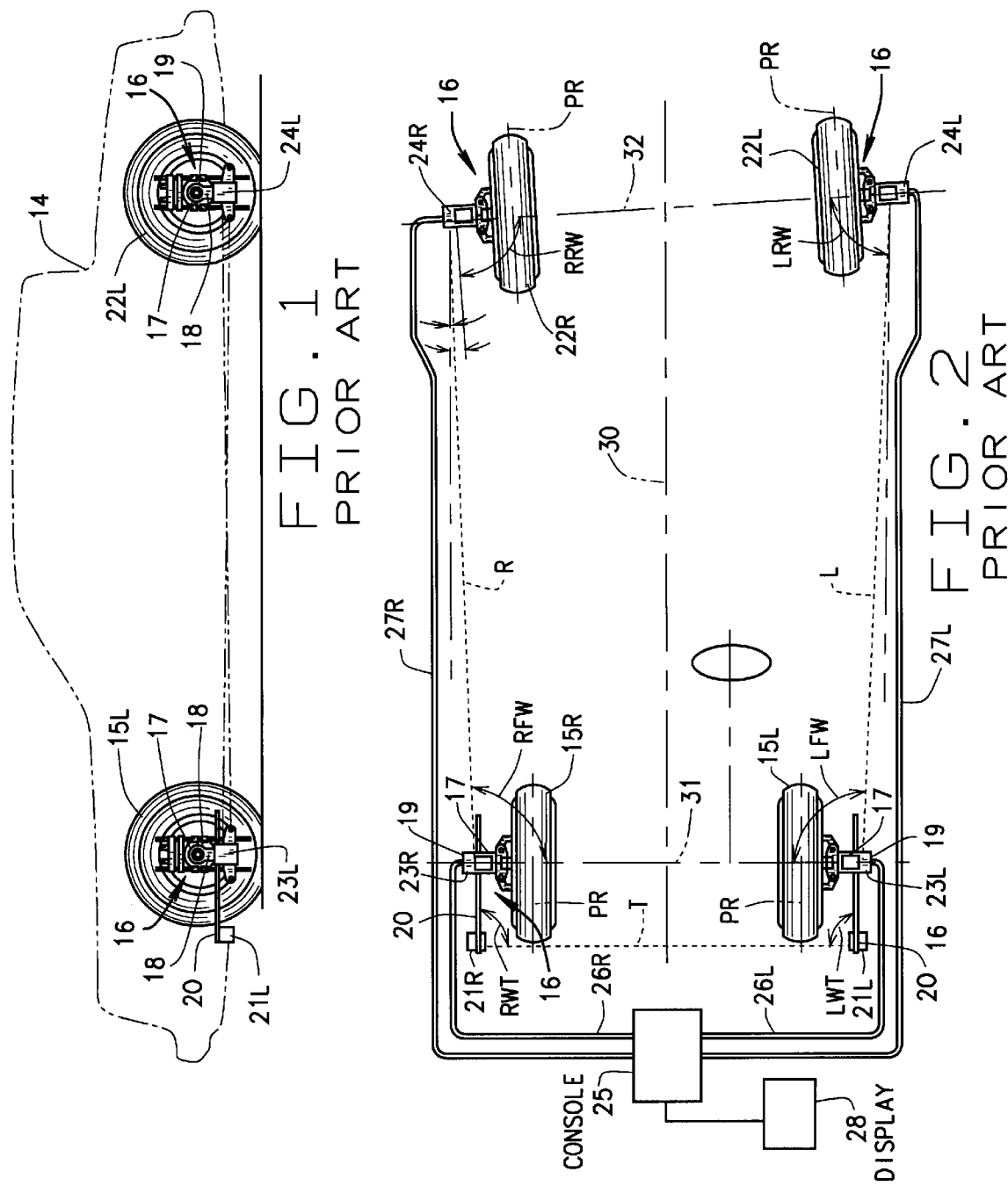

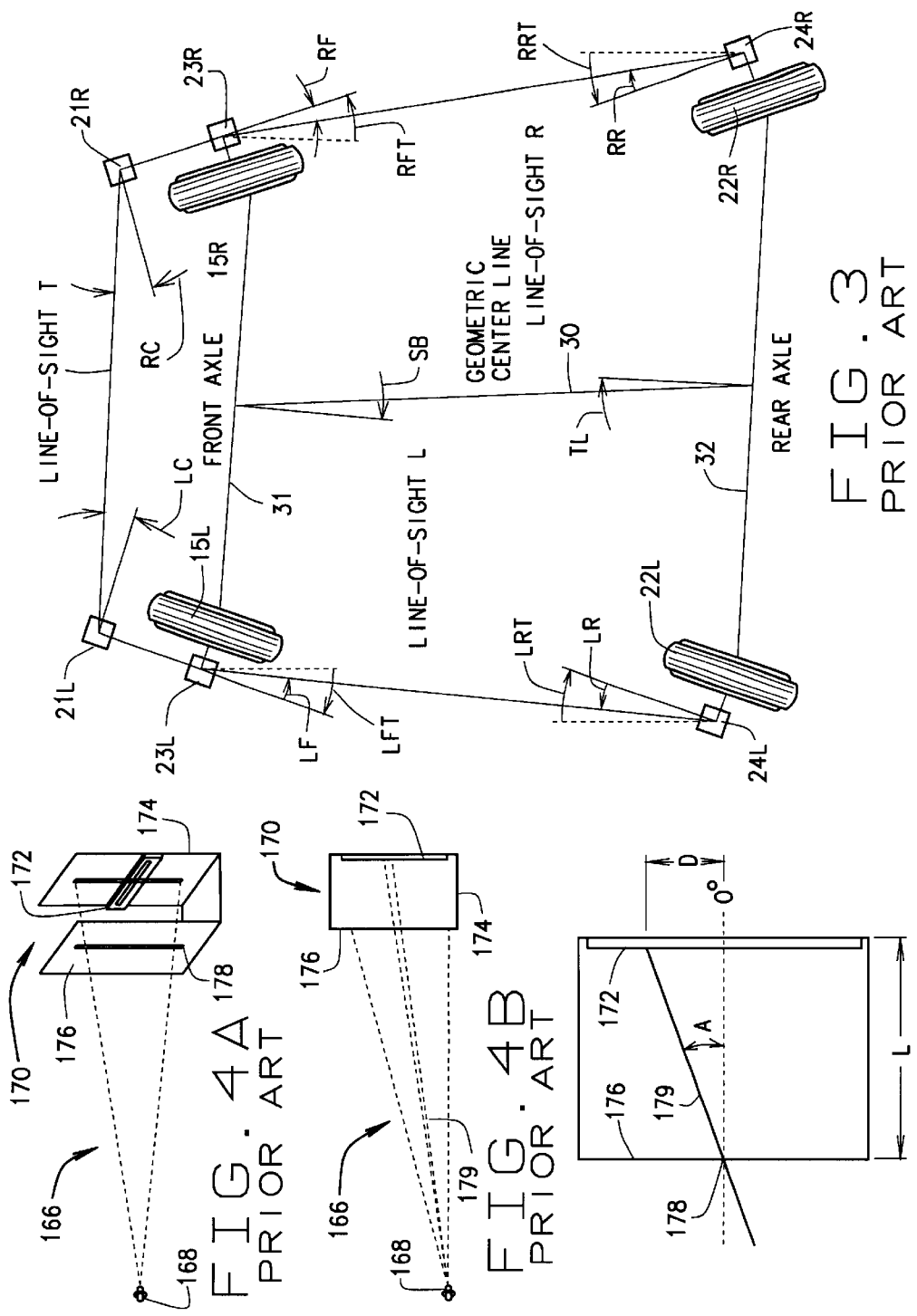

VEHICLE ALIGNMENT SENSOR SYSTEM

STATEMENT REGARDING FEDERALLY SPONSORED RESEARCH OR DEVELOPMENT

Not Applicable.

BACKGROUND OF THE INVENTION

This invention relates to vehicle wheel alignment systems, and in particular to improved sensors in a vehicle wheel alignment system.

Various systems have been designed to determine vehicle wheel alignment angles such as camber, caster, steering axis inclination (SAI), and toe. These systems conventionally employ an optical emitter and an associated optical receiver mounted on cooperative pairs of transducer, as is described in U.S. Pat. No. 5,488,471 to McClenahan et al. A sensor head emits a signal which is transmitted to the receiver of the associated sensor head of the pair. The receiver converts this signal into a value which is indicative of the corresponding toe angle of the vehicle. Thus, wheel alignment sensors have operated using essentially cooperative pairs of emitters and detectors wherein the detector, mounted on one wheel, actively senses the angle of the line of sight to a corresponding emitter mounted on an adjacent wheel. The signals presently used in these sensor heads is an electromagnetic signal in the visual or infrared range (hereinafter, referred to as light). The light impinges upon a sensing device in the receiver whose output is representative of the measured angle. Currently, photodiodes, as set forth in U.S. Pat. No. 4,302,104, which is incorporated herein by reference, and linear array type charge coupled devices (CCDs), as set forth in U.S. Pat. No. 5,018,853, are used as the receiver.

Although the individual detector sensor assembly construction and operation can vary, a conventional prior art example is depicted in FIGS. 1–4. The view of FIG. 1 is of a passenger vehicle 14 which will serve to illustrate the utility of the presently preferred embodiment of the invention. As seen from the left side, the left steerable wheel 15L is shown in association with one form of an instrument support 16 adapted to grip the flange of the wheel rim. The support 16 carries a pivotal housing 17 the axis of which is substantially centerable to the spindle axis (not shown) on which the wheel 15L rotates. A bracket 18 is hung from the housing 17 so it may assume a substantially vertical position even though the wheel 15L is jacked up so it may rotate. At times, with the wheel 15L resting on its support, it may be desirable to secure the bracket 18 against pendulous movement by tightening up on a knob 19 (FIG. 2). The bracket 18, in addition to the housing 17, carries a support arm 20 which extends forwardly of the housing 18 to clear the tread of wheel 15L and be in position so that its end portion may be used for supporting an instrument device 21L. The support arm 20, or some associated part of the assembly, is usually provided with a spirit level (not shown) for purposes of locating the arm in substantially horizontal position, which position is retained by tightening up on the knob 19.

Further shown in FIG. 1 is the vehicle non-steerable wheel 22L to be provided with an instrument support 16 which is identical to the support attached to the steerable wheel 15L. The several parts are designated by similar reference numerals and need not be described again. It is particularly important to observe that the support 16 at the left steerable wheel 15L carries an instrument 23L and the support 16 for the left non-steerable wheel 22L carries a companion instrument 24L. These instruments 23L and 24L are made up of cooperating components which are intended to function with each other in a manner set forth in U.S. Pat. No. 4,319,838 to Grossman, et al.

FIG. 2 shows a schematic plan view of all vehicle wheels, such as those at the left side seen in FIG. 1, and companion right side wheels 15R and 22R. The wheels at the left side are distinguished by adding the suffix "L", and those at the right side are distinguished by the suffix "R". However, each wheel 15R and 22R is provided with an instrument support 16 having the construction generally described above. Also, the support 16 on steerable wheel 15R has a support arm 20 which carries an instrument 21R to cooperate with the left side instrument 21L. In addition, the support 16 at the non-steerable wheel 22R carries an instrument 24R to cooperate with an instrument 23R carried by the support 16 at the steerable wheel 15R. These instruments 21L and 21R, as well as instruments 23R and 24R, cooperate with each other and are made up of components operating in a manner described in the '838 Grossman et al. patent.

In view of FIG. 2, the instruments 21L and 23L are in communication into a console assembly 25, such as by cables 26L and 26R, or by a conventional wireless communications system, and in like manner, the instruments 24L and 24R are in communication with console 25. Signal processing and alignment computation are performed in the console 25 and the results can be displayed by means indicated collectively at 28. More particularly in FIG. 2, the instruments 21L and 21R cooperate with each other in the process of measuring the angles LWT (left wheel toe) and RWT (right wheel toe). For that purpose instrument 21L has radiant energy detector means which is responsive to a source of radiant energy from instrument 21R, and instrument 21R has radiant energy detector means responsive to a source of radiant energy from instrument 21L. The essence of this cooperation is that projectors of radiant energy are disposed to direct beams in criss-cross paths transversely of the vehicle, and which paths have boundaries within the field of vision of the detector means arranged to look at the position from which the beam is projected.

In a like manner, it is indicated in FIG. 2 that instruments 23L and 24L, each containing radiant energy beam projectors and radiant energy detectors, cooperate with each other in the process of measuring the respective angles relative to a vehicle reference axis 30 which is established by a line joining the center points of the axles 31 and 32, which center points are centered between the spacing of the wheel sets 15L and 15R, and 22L and 22R. The angle LFW is formed between the axle 31 and the longitudinal line-of-sight L of the radiant energy beam from the instrument 24L at wheel 22L. The angle LRW is formed between the axle 32 and the longitudinal line-of-sight L of the radiant energy beam from the instrument 23L at wheel 15L. Similarly, the instruments 23R and 24R cooperate with each other for measuring the angles RFW and RRW by the criss-crossing of the radiant energy beams depicted by the dash line R representing the longitudinal line-of-sight between the detector means in the instruments 23R and 24R. In the example seen in FIG. 2, the wheels 15L and 15R have planes of rotation PR which are substantially perpendicular to the axle 31, while the planes of rotation PR of the wheels 22L and 22R are also substantially perpendicular to axis 33. This arrangement shows that the angles LWT and RWT are substantially ninety degrees (90°) since it is presumed that the instrument support arms 20 are substantially parallel to the planes of rotation PR for wheels 15L and 15R. However, it is shown in FIG. 2 that the tread spacing for wheels 22L and 22R is greater than for the tread spacing of the wheels 15L and 15R. In addition, wheel 22L is toed out relative to the reference axis 30 while wheel 22R is toed in relative to the same axis 30. The angular positions for the respective wheels 15L, 15R, 22L and 22R are arbitrary for purposes of illustrating the unique advantages of having active instruments at each wheel for measuring wheel position angles from each other and relative to the reference axis 30 for the vehicle.

FIG. 3 is a diagrammatic view of the wheels 15L, 15R, 22L and 22R of the vehicle 14 of FIGS. 1 and 2, but in this view the wheels have been intentionally mis-aligned to illustrate the geometry of wheel alignment investigation using the foregoing principle instrumentation. The instruments are generally shown and designated by the reference characters appearing in FIG. 2, and the alignment is calculated with reference to a geometric center line 30 (FIGS. 2) of the vehicle. It is necessary to understand that there is a line-of-sight T between the instruments 21L and 21R which represents the radiant energy beam path from the respective instruments 21L and 21R. The line-of-sight may not be the center of the beam, but the beam has a sufficient spread or fan to be seen by the opposing beam sensors. Normally the wheels will not be so far out of alignment as is depicted in FIG. 3 that the beam will not be seen. In like manner there is a line-of-sight L between the instruments 23L and 24L representing the radiant energy beam path from the respective instruments 23L and 24L. The line-of-sight R between the instruments 23R and 24R depicts the path of the radiant energy beams from those respective instruments. There are construction lines on the drawing of FIG. 4 to assist in visualizing the angles to be investigated, such as the dash lines which are parallel to the geometric center line 30, and act as a reference for the angles.

The angles indicated in FIG. 3 are shown in tabular form with reference to the position of the beam projectors, and beam sensors used to determine those angles.

| PROJECTOR LOCATION | SENSOR LOCATION | MEASURED ANGLE |
| --- | --- | --- |
| Right front toe arm | Left front toe arm | Left cross LC |
| Left front toe arm | Right front toe arm | Right cross RC |
| Left rear wheel | Left front wheel | Left front longitudinal LF |
| Right rear wheel | Right front wheel | Right front longitudinal RF |
| Left front wheel | Left rear wheel | Left rear longitudinal LR |
| Right front wheel | Right rear wheel | Right rear longitudinal RR |

The following computations relative to the geometric reference line 30 are worked out for the several angles pertinent to the alignment determination, as follows:

| ANGLES COMPUTED | ALGORITHM |
| --- | --- |
| LFT (left front toe) | ½(LC + RC + LF − RF) |
| RFT (right front toe) | ½(LC + RC − LF + RF) |
| TFT (total front toe) | LFT + RFT = LC + RC |
| SB (set back) | ½(RC − LC + LF − RF) |
| LRT (left rear toe) | LFT − LF + LR = (LC + RC − LF − RF) + LR |
| RRT (right rear toe) | RFT − RF + RR = ½(LC + RC − LF − RF) + RR |
| TRT (total rear toe) | LRT + RRT = LC + RC − LF − RF + LR + RR |
| TL (thrust line) | ½(LRT − RRT) = ½(LR − RR) |
| LFTTH (left front toe relative to thrust line) | LFT − TL |
| RFTTH (right front toe relative to thrust line) | RFT + TL |

FIGS. 4A and 4B are perspective and top views, respectively, illustrating a prior art linear CCD angle detector 166 which may be utilized with the present invention. Sensor 166 comprises light source 168 and optical bench 170. Radiation source 168 is coupled to one head unit, 118L for example, and optical bench 170 is mounted to another 155 head unit, 18R for example.

Optical bench 170 includes linear CCD 172 and frame 174. Frame 174 includes a mask 176 which defines a slit 178. Slit 178 may comprise a cylindrical lens, and a filter (not shown) may be placed in front of CCD 172 to reduce interference from stray light sources. Slit 178 is at a right angle to linear CCD 172, allowing a portion of the light from light source 168 to fall upon linear CCD 172. The remaining portion of the light from light source 168 directed at linear CCD 172 is blocked by mask 176. As seen in FIG. 5, the angle A at which the light passing through the slit 178 deviates from an axis perpendicular to the CCD 172 corresponds to a distance D along the CCD 172 at which the light will be detected, and accordingly, can be calculated through conventional algorithms once the point of illumination on the CCD 172 is known, yielding the relationship between the light source 1687 and the CCD 172. A suitable linear CCD 172 is TCD 102D available through Toshiba, 7300 Metro Boulevard, Edina, Minn. 55435.

FIG. 4A shows the relationship between light source 168 and optical bench 170 at an angle of 0 degrees. FIG. 4B shows the relationship of light source 168 and optical bench 170 when light source 168 is not in alignment with optical bench 170.

Typically, six angle sensors 166 in the horizontal plane are used to measure the alignment of the wheels of an automotive vehicle. Angle sensor 166 can use infrared or visible light sensors and sources. The multi-element linear CCD 172 comprises a row of 2048 pixels and is used to sense light from light source 168. Slit 178 and mask 176 allow only a portion of the 2,048 pixels to be illuminated by light source 168. Typically, the image will illuminate about 20 to 22 pixel elements of linear CCD 172. However, the width of the image projected on linear CCD 172 may range from about 2 pixel elements to about 80 pixel elements.

As optical bench 170 is rotated and the angle between optical bench 170 and light source 168 is changed, the line of light 179 admitted by slit 178 moves across the pixels of linear CCD 172. At zero degrees, pixel elements near the center of linear CCD 172 are illuminated. As the bench is rotated, elements farther from the center of the sensor are illuminated. The angle of rotation A is found by determining which of the pixel elements of linear CCD 172 are illuminated and calculating how far the angle is from zero degrees, as is seen in FIG. 5.

Slit length determines the range of the allowed tilt of the sensor in an axis perpendicular to the axis of measurement (allowed camber angle) while measuring toe or allowed pitch angle while measuring toe with track sensors. A range of plus or minus 12 degrees is obtained by making the length of slit 178 about equal to the length of linear CCD 172. This should be sufficient for most alignment needs. If the distance between slit 178 and linear CCD 172 is changed from 2⅝ inches, the length of slit 178 should also be changed to maintain a range of plus or minus 12 degrees. For example, if the distance between slit 178 and linear CCD 172 is doubled, the length of slit 178 must also be doubled.

The purpose of linear CCD 172 is to convert light energy from light source 168 into electrical energy and provide an output representing an image. Linear CCD 172 uses a linear array of about 2,048 photo-sensitive cells (pixels) which collect light for a controlled period of time (the exposure time), and provide a serial output of data from the pixels. This output is essentially a "snapshot" or "picture" of the scene to which linear CCD 172 was exposed. An algorithm is employed to locate the image of the slit which falls on linear CCD 172 due to light source 168 and the angular relationship between light source 168 and optical bench 170 is calculated.

Equipment of this general type and using the apparatus and methods enumerated above has been used world-wide for many years. Such equipment is capable of determining the camber, caster, and pointing or "toe" alignment angles of the wheels relative to one or more appropriate reference axes, and is sufficient to allow proper adjustment of the alignment so as to reduce tire wear and provide for safe handling. It is believed, however, that such equipment could be improved in terms of both cost and reliability. Moreover, checking the calibration of presently available systems is not a particularly accurate process. Such calibration checks are particularly unsuited for checking camber calibration and even for toe calibration those checks do not typically identify the sensor transducer which may be out of calibration.

SUMMARY OF THE INVENTION

Among the various objects and features of the present invention may be noted the provision of an improved sensor system for detecting alignment and suspension measurements.

A second object is to provide such a sensor system which will accurately determine vehicle wheel alignment and steering angles.

A third object is to provide such a sensor system which provides easy and accurate calibration checks for both camber and toe.

These and other objects will become apparent to those skilled in the art in light of the following disclosure and accompanying drawings.

Briefly, in the preferred embodiment of the present invention, a vehicle alignment sensor system includes at least first and second sensor assemblies mounted to a pair of adjacent vehicle wheels and forming a cooperative pair of sensors for measuring a first vehicle alignment angle. The first sensor assembly includes at least one detector, and the second sensor assembly includes at least a pair of emitters in a fixed and known geometrical relationship with respect to each other and to the wheel. The detector is capable of measuring the apparent geometrical relationship of the pair of emitters to determine a relative alignment angle of the second vehicle wheel, whereby a second alignment angle of the vehicle is determinable.

In a first alternative aspect of the present invention, a method of determining vehicle alignment angles includes the steps of measuring at a first vehicle wheel a first vehicle alignment angle, mounting at least a pair of emitters in fixed geometrical relationship with respect to each other on an adjacent, second, wheel of the vehicle, and observing the apparent geometrical relationship of said pair of emitters to determine an alignment angle of the second vehicle wheel.

In a second alternative embodiment of the present invention, a method of checking calibration in an apparatus for determining camber of vehicle wheels includes the steps of disposing first and second sensor assemblies in a fixed geometrical relationship with first and second adjacent wheels of a vehicle, respectively, said sensor assemblies each having a conventional inclinometer configured to measure a true camber angle for each of said wheels, and further including at least a first detector and at least a pair of emitters operating in cooperative pairs for determining relative camber angles for adjacent wheels, converting the relative camber angles to calculated camber angles, and determining if at least one of said sensor assemblies is properly calibrated by comparing the true camber angle with the calculated camber angle for the corresponding wheel obtained from the corresponding cooperative detector and emitter pairs associated with the respective vehicle wheel.

In a third alternative embodiment of the present invention, a method for checking the calibration of an apparatus for determining toe angles of vehicle wheels which includes the steps of determining with sensor assemblies the first toe angle for an adjacent pair of wheels, disposing in a fixed geometrical relationship with respect to at least one of the pair of wheels, a pair of emitters in a known orientation, determining a second toe angle of said at least one wheel using said pair of emitters, and determining if at least one of said sensor assemblies is properly calibrated by comparing the determined first toe angle with the second toe angle for the corresponding wheel.

In a fourth alternative embodiment of the present invention, a method of providing redundant measurements in an apparatus for determining alignment angles of vehicle wheels includes the steps of mounting first and second sensor assemblies on first and second adjacent wheels of a vehicle, respectively. Each sensor assembly including a conventional transducer for determining at least one alignment angle for the associated wheel, determining the absolute alignment angles for the wheels from said conventional transducers, disposing in a fixed geometrical relationship with respect to at least one of the wheels of a vehicle a pair of emitters in a generally first orientation and an additional emitter generally at right angles to said pair of emitters, determining a relative alignment angle between said first wheel and said second wheel having a detector, using the pair of emitters and the additional emitter, converting the relative alignment angle to a calculated angle, and determining if at least one of said sensor assemblies is properly calibrated by comparing the absolute alignment angle calculated from the pair of emitters and the additional emitter from the absolute alignment angle for the corresponding wheel obtained from the conventional transducer.

BRIEF DESCRIPTION OF THE DRAWINGS

In the accompanying drawings which form part of the specification:

FIG. 1 is prior art illustration of a side elevational view of steerable and non-steerable wheels related to a typical vehicle shown in silhouette;

FIG. 2 is prior art a diagrammatic plan view of a representative alignment pattern for the wheels of the vehicle seen in FIG. 1;

FIG. 3 is a prior art diagrammatic layout of the vehicle wheels for the purpose of illustrating the measurement of the angles of the respective wheels relative to a geometric center line;

FIG. 4A is a perspective view of a prior art angle sensor;

FIG. 4B is a plan view of the prior art angle sensor of FIG. 4A;

FIG. 5 is a diagram which shows the angle of light in entering the prior art angle sensor of FIGS. 4A and 4B;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention. Reference will now be directed to the drawings for a more complete understanding of the intent and scope of the invention presented in terms of an embodiment presently preferred.

Like the traditional vehicle alignment systems described above, the improved system of the present invention also uses at least one cooperative pair of sensors. However, in the preferred embodiment, some or all of the lateral pairs of active sensors are replaced by a pair (or pairs) consisting of one active and one passive sensor as is illustrated in FIG. 6.

Figure 6:
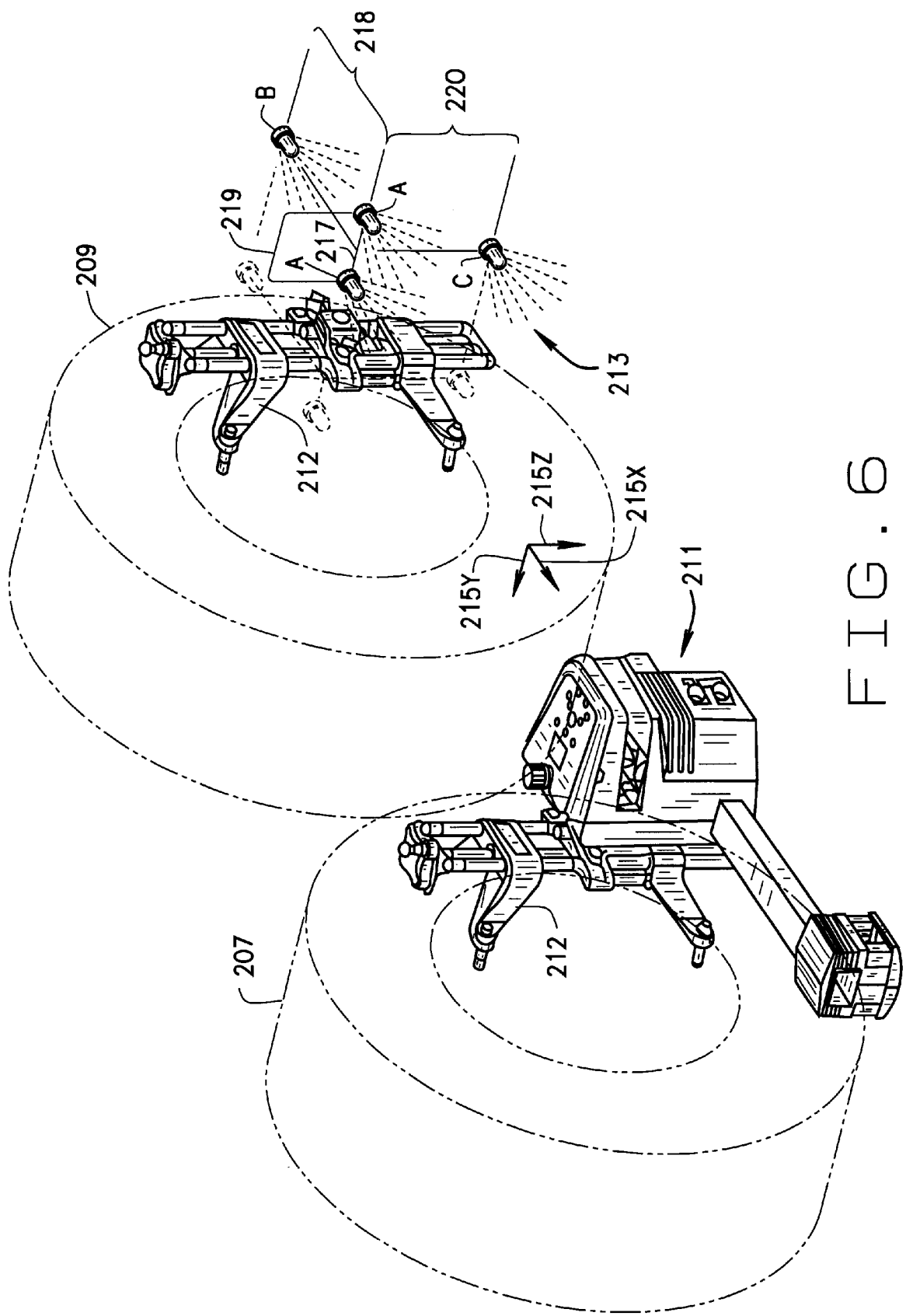
FIG. 6 is a perspective view of a sensor system of the present invention, showing front and rear sensor assemblies for one side of a vehicle, with emitter placement shown in simplified schematic form.

FIG. 6 shows a conventional wheel alignment sensor assembly 211 (in this case a front sensor such as that sold by the present assignee under the trade designation DSP-300) mounted with a clamp 212 to a front wheel 207 of a vehicle to be aligned, and a passive sensor assembly 213 depicted schematically (housing not shown). The actual position of the sensor assembly 213 is immediately adjacent clamp 212—shown in broken line—while the solid line depiction of sensor assembly 213 is shown as removed from the clamp 212 for purposes of clarity. Sensor 213 includes a plurality of emitters, pair A—A, B, and C mounted with a clamp 212, to the adjacent rear wheel 209. The emitters, pair A—A, B, and C, emit light in the general direction of tire and wheel 207. The multiple emitters are discussed below.

In this system, the longitudinal toe values for the front sensor assembly 211 (the angles LF and RF in FIG. 3, between the longitudinal axis of sensor 211 and the line of sight to the corresponding pair of emitters A—A shown in FIG. 6, mounted in the rear sensor assembly 213) are measured in the same way that they would be in conventional systems, such as that sold under the trade designation DSP-300 by the assignee of the present invention. It should be understood that similar front and rear sensor assemblies would be used for the other side of the vehicle. It should also be understood that the various sensor assemblies could be in communication with a separate console for computing the alignment angles in the manner discussed below from the various measurements, or the computation could take place in one or more of the sensor assemblies themselves. These computations would be carried out by in the manner previously detailed, whether within the sensors or otherwise.

In order to provide an orientation for the following spatial descriptions and related mathematical computations, a Euclidean coordinate system 215 is defined. The coordinate axes 215$x$, 215$y$, and 215$z$ are on the longitudinal, transverse (side-to-side), and vertical directions, respectively, of a vehicle to be aligned. Coordinate system 215 point of origin is shown in FIG. 6 at a position along a line connecting the sensor assemblies 211 and 213 and behind the sensor assembly 213 in the negative 215$x$ direction. Absolute distances along the various axes 215 from the point of origin are arbitrary, since only relative distances are of consequence to the present invention. Accordingly, in various figures, the point of origin is depicted in differing locations. The directions of the coordinate axes 215, however, are significant, and these axes provide a reference orientation throughout the drawings.

Rear longitudinal toe (angles LR and/or RR in FIG. 3) is measured with the present invention in a different manner from that conventionally used. The longitudinal toe measurement of rear wheel 209 is determined by sensor assembly 211, from measurements of the light from the emitters pair A—A and B of the rear sensor assembly 213. The sensor 211 determines the line of sight of radiation it detects from the emitters pair A—A and B, respectively. Operationally, the sensor 211 would operate similarly to optical bench 170.

Figure 7:
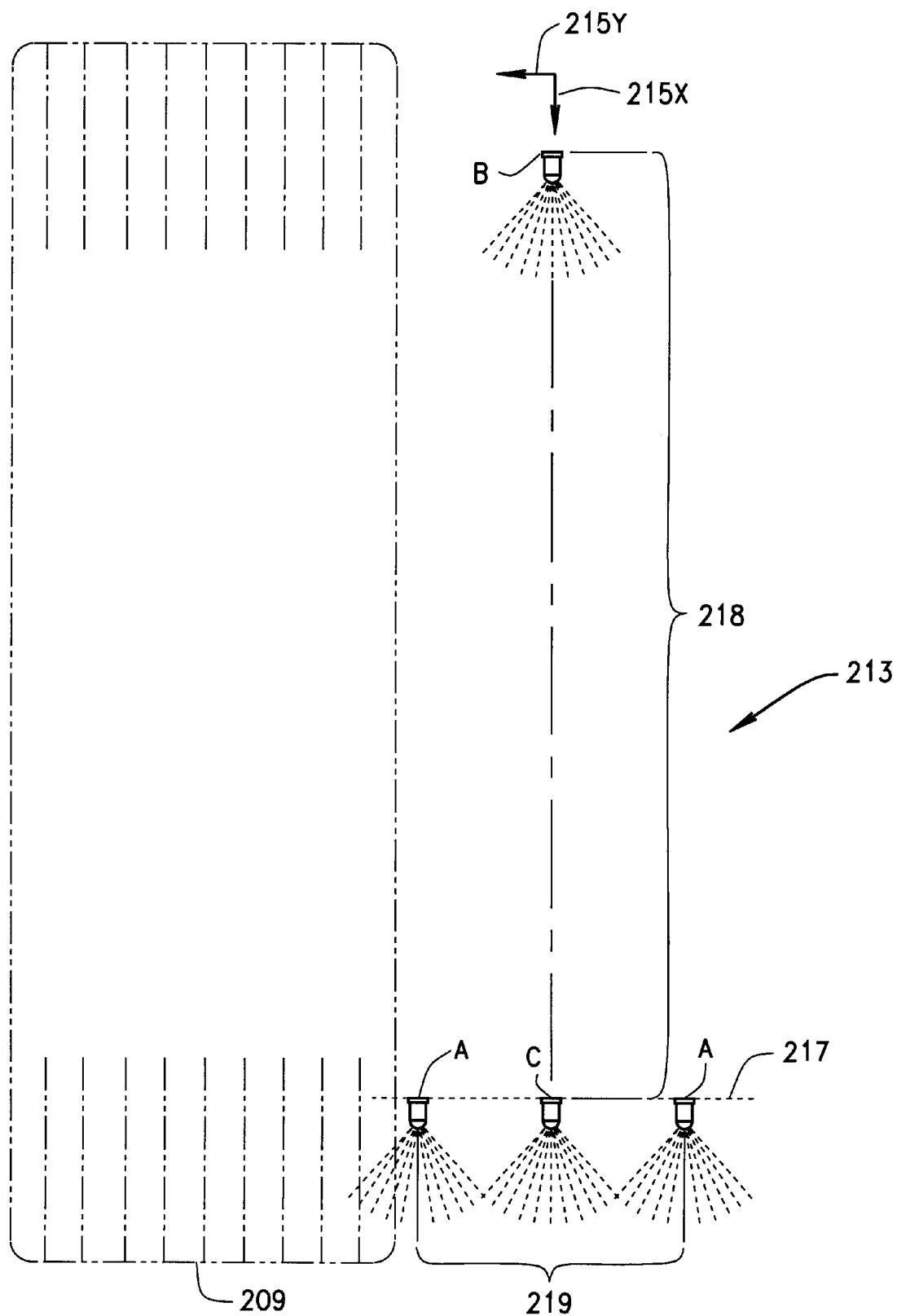
FIG. 7 is a simplified schematic top view showing the emitter configuration of FIG. 6.

As shown in FIG. 7, the pair A—A emitters are disposed along dotted line 217 while emitter B is disposed a separation 218 behind line 217. In FIG. 7, the view is along the axis 215$z$ (top), with the axes 215$y$ and 215$z$ disposed as shown. The pair A—A emitters are a separation 219 apart. The B emitter is preferably disposed behind the midpoint between the emitters A along line 217 (when forward—the direction parallel to 215$x$—is the direction of the emitted light). For example, separation 219 can be approximately 3" inches apart, and separation 218 can be roughly 10 inches.

Figure 8:
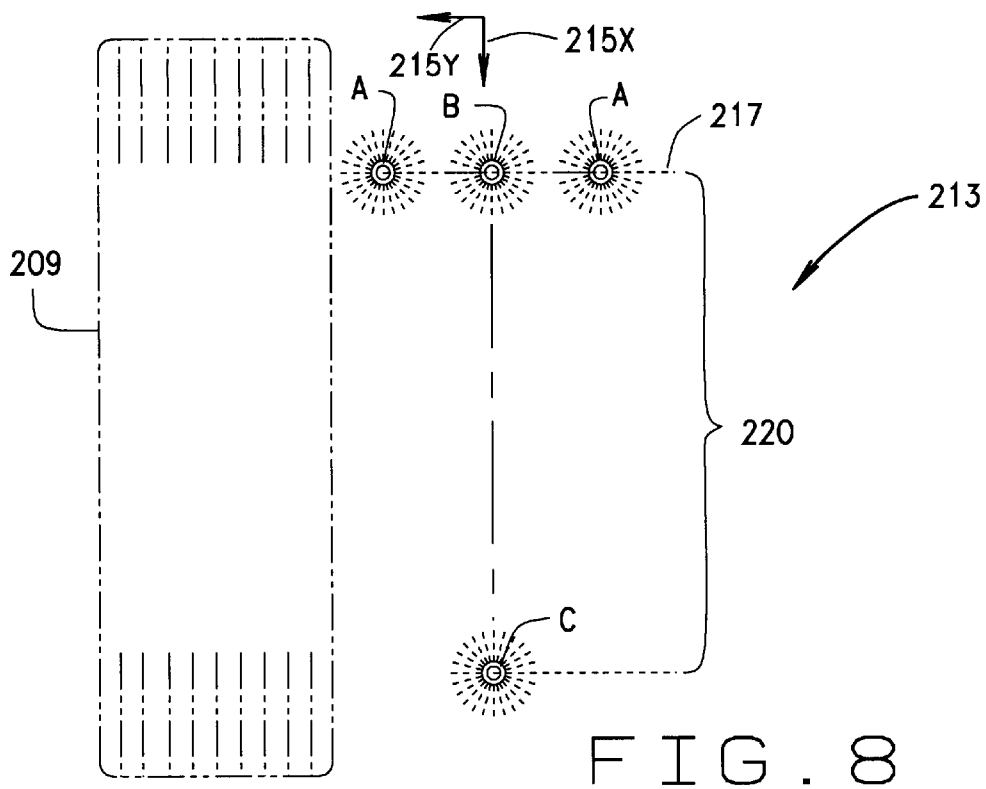
FIG. 8 is a simplified schematic plan view along the detector's line of sight showing the emitter configuration of FIG. 6.

As shown in FIG. 8, the C emitter is disposed a separation 220 below line 217. In FIG. 8, the view is along the axis 215$x$ (front), with the axes 215$y$ and 215$z$ disposed as shown. In this view point. The light from the emitters is directed out of the plane of FIG. 8, and at the viewer. The C emitter is preferably disposed below—in the direction 215$z$—the midpoint between the emitters A along line 217. For example, separation 220 can be approximately 8 inches.

Figure 9:
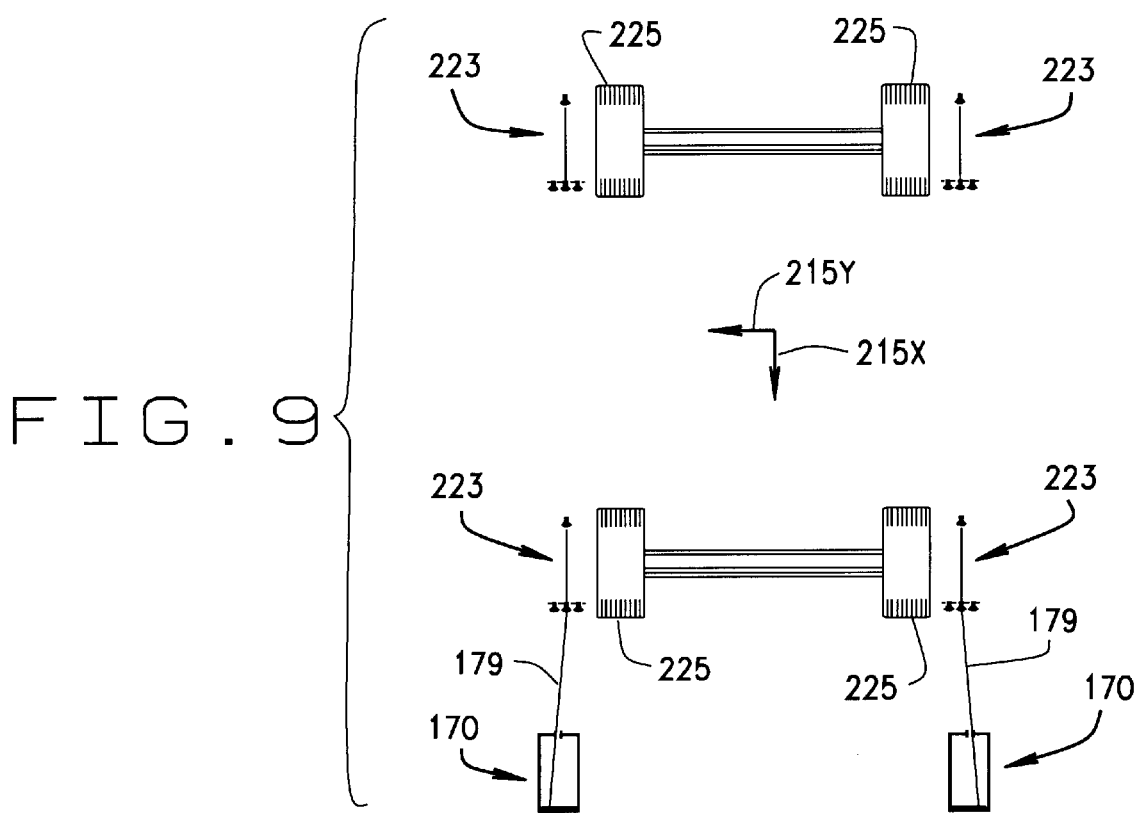
FIG. 9 is a block diagram view illustrating an alternative embodiment of the system of FIG. 6.

Turning to FIG. 9, it is seen that an alternate embodiment of the present system functions where the angle measuring (active) detector, such as optical bench 170 receiving admitted light 179, is not mounted to the wheels of the vehicle but is instead mounted apart from the vehicle. In FIG. 9, the view is along the axis 215$z$ (top), with the axes 215$y$ and 215$z$ disposed as shown. An array of emitters 213 would then be mounted to each wheel 225 and the positions and orientations of the wheels determined. A detector 170 on each side of the vehicle, as shown, or even a single detector shifted from side to side (not depicted), could make all the necessary determinations of the alignment angles of the wheels 225.

Figure 10:
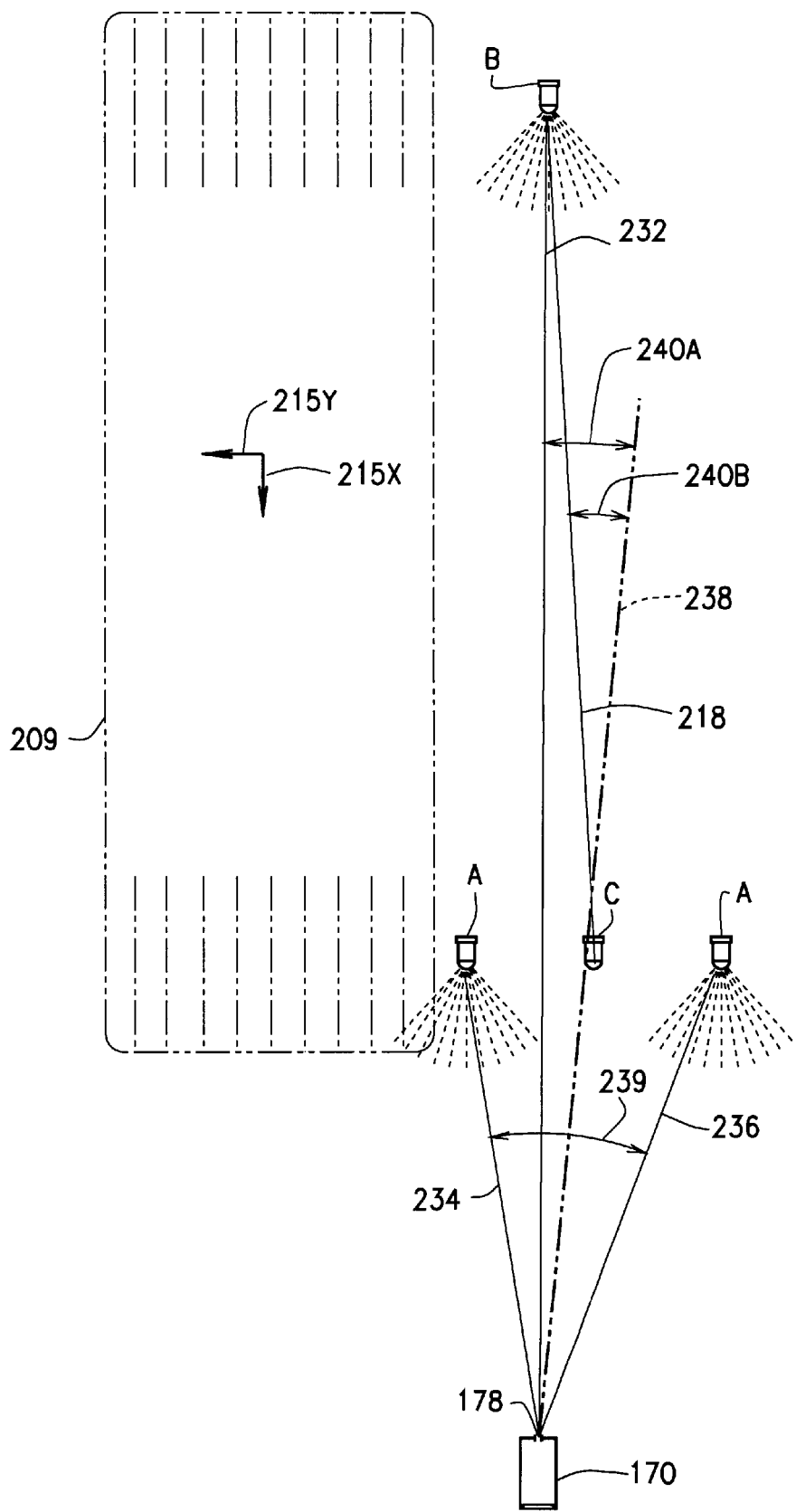
FIG. 10 is a schematic top view of the system of FIG. 6 depicting the relevant lines of sight and angles to be determined from the detector's and emitters' relative positions when measuring longitudinal toe.
Figure 11:
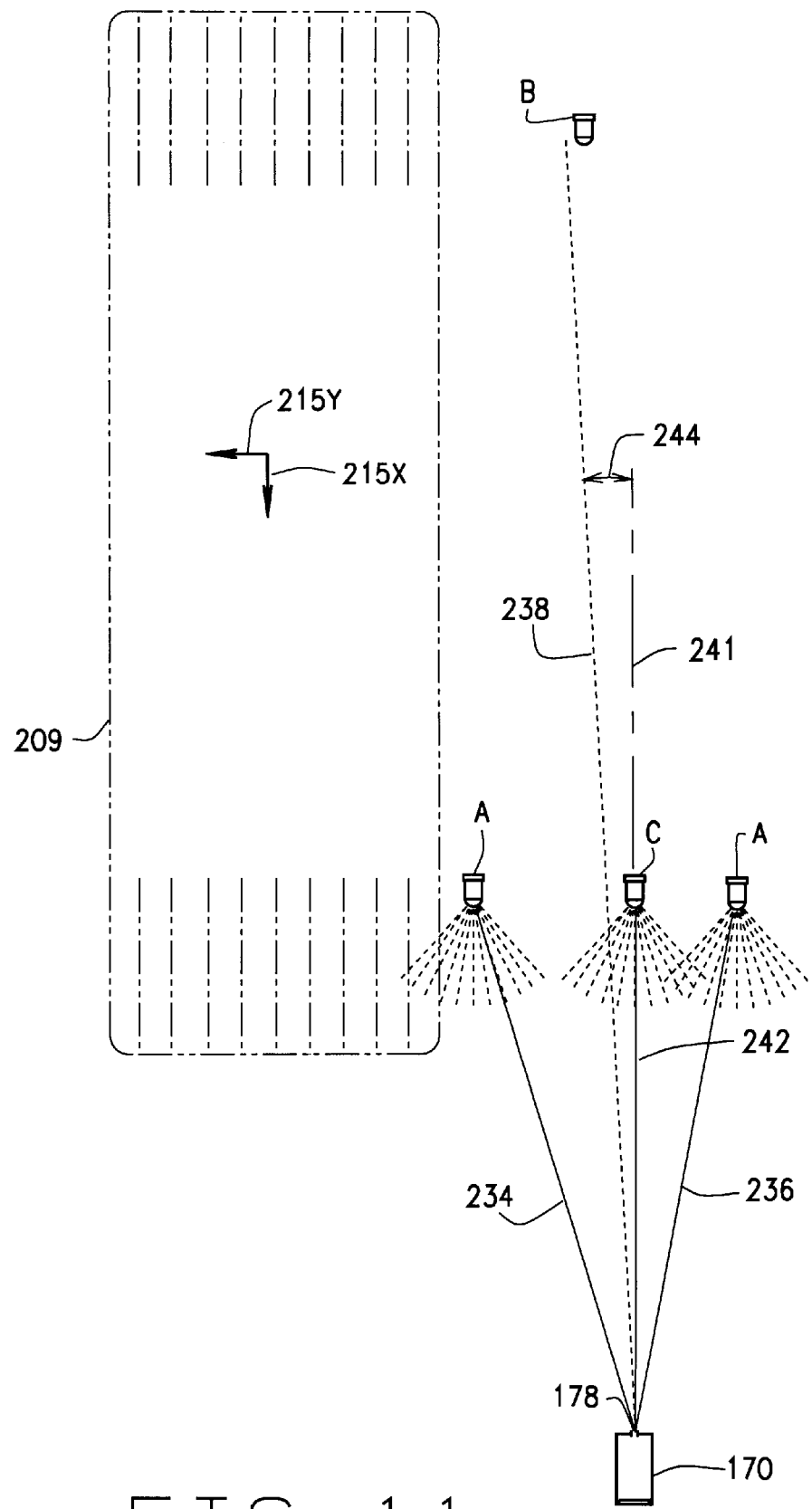
FIG. 11 is a schematic top view of the system of FIG. 6 depicting the relevant lines of sight and angle to be determined from the detector's and emitters' relative positions when measuring camber.

In both FIGS. 10 and 11 following, the view is from the direction 215z (top) with the axes 215x and 215y disposed as depicted.

Referring to FIG. 10, a detector, such as optical bench 170 with slit 178, has line of sight 232 to emitter B and lines of sight 234 and 236 to emitters pair A—A. The angles of incidence of radiation from emitters pair A—A along 234 and 236 are averaged to determine the angle of median line 238. Angle 240 between lines 232 and 238 is then determined. Once the front and rear longitudinal toe values have been determined, total four wheel toe alignment geometry of the vehicle can be determined with the addition of transverse toe values obtained in a similar manner, or in a conventional manner.

The discussion to this point has been limited to determination of toe angles. The present invention is also able to measure relative camber between two adjacent sensor assemblies. Referring to FIG. 11, the sensor assembly 211 bisects lines of sight 234 and 236 to determine intermediate line 238. Sensor assembly 211 also determines the line of sight 242 to emitter C. The radiation received from emitter C is measured and the line of sight 241 to emitter C is utilized with intermediate direction 238 to determine an angle 244. Though the sensor assembly 211 is only capable of measuring angles in its horizontal plane, the relative horizontal positions of emitters pair A—A and C can be utilized to determine the camber of the emitter sensor assembly 213 relative to the sensor assembly 211. The angle 244, the separation 220 between C and the point intermediate of emitters pair A—A, in combination with the geometric relationship of these emitters to the rear sensor assembly's vertical axis, are processed by the information processor described previously to determine the relative camber of the rear sensor to the front sensor. Knowing the relative value, it can then be compared to the front sensors' camber (which has been measured by conventional means such as a gravity-referenced camber transducer) and the true camber value of the rear sensors determined.

Many variations on this scheme could be used. For example, the passive and active transducers could be switched between sensors. Additional sensors could be added that sense vertical positions of the emitters mounted to an opposed sensor resulting in the ability to check sensor level and caster adjust or measure SAI.

It has been found that measuring toe angles in the previously described manner allows an inexpensive way of verifying calibration of traditional systems by providing redundant measurements. In such a system, each sensor assembly includes not only the traditional means of measuring toe and camber, but also the passive means disclosed and discussed above. The traditional measurements and the active/passive measurements discussed above can be compared to determine not only whether the total system of four sensor assemblies is in calibration, but also to determine which sensor assembly, if any, is out of calibration. In addition, these calibration checks are able to check both toe and camber calibration, which is not the case with many prior calibration checking systems. Camber measurements made in the above-described manner could also provide a method of verifying camber measurements made by more conventional means. Averaging redundant measurements could result in more fault tolerant systems.

Passive sensors of the sort described above could be used for determining frame angle and providing frame reference when performing truck alignment. Although it is contemplated that LED and laser diode emitters and/or CCD detectors would be used in the present system, they could be replaced by other devices serving the same purposes, e.g., retro-reflectors and dual diode toe transducers.

The position and number of emitters used to make the toe measurement is not critical except that there must be at least two emitters and the relative positions of the emitters known (or discernible) and positioned such that they provide adequate movement, i.e. front-to-back separation between emitters for the determination of toe and top-to-bottom separation for the determination of camber, to provide suitable measurements.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A vehicle wheel alignment sensor comprising:

a housing configured for attachment to a vehicle wheel clamp, said housing having an axis of rotation;

a pair of radiation emitters mounted in a known, fixed relationship to said housing, said pair of radiation emitters disposed along an axis parallel to said axis of rotation of said housing;

a third radiation emitter mounted in a known, fixed relationship to said housing, said third radiation emitter displaced perpendicular to said axis of said pair of radiation emitters, said third radiation emitter and said pair of radiation emitters defining a substantially horizontal plane;

a fourth radiation emitter mounted in a known, fixed relationship to said housing, said fourth radiation emitter displaced from said substantially horizontal plane defined by said pair of radiation emitters and said third radiation emitter, said fourth radiation emitter and said pair of radiation emitters defining a substantially vertical plane.

2. In a vehicle wheel alignment system, a cooperative pair of vehicle wheel alignment sensors comprising:

a first sensor for attachment to a first vehicle wheel, said first sensor including a radiation detector configured to observe incident radiation;

a second sensor for attachment to a second vehicle wheel adjacent said first vehicle wheel, said second sensor including at least two radiation emitters in a known geometric configuration;

wherein said radiation detector is configured to measure an angle for said first vehicle wheel by observing an incident angle of radiation along a single axis from at least one of said at least two radiation emitters on said second vehicle wheel, and an angle for said second vehicle wheel by observing a single axis perspective displacement of incident radiation from said at least two radiation emitters relative to said known geometric configuration.

3. A vehicle wheel alignment sensor comprising:

a housing configured for attachment to a vehicle wheel clamp;

a pair of radiation emitters mounted in a known, fixed relationship to said housing;

a third radiation emitter mounted to said housing in a first known, fixed relationship to said pair of radiation emitters, said third radiation emitter and said pair of radiation emitters defining a first plane;

at least one single-axis radiation detector having a field of view including said pair of radiation emitters and said third radiation emitter; and wherein said single-axis radiation detector is displaced from said housing such that single-axis apparent displacement in said field of view, of said third emitter from said pair of emitters varies from said first known relationship in trigonometric relation to a first alignment angle.

4. The vehicle alignment sensor of claim 3 wherein said single-axis apparent displacement is apparent horizontal displacement.

5. The vehicle alignment sensor of claim 3 wherein said single-axis apparent displacement is apparent vertical displacement.

6. The vehicle alignment sensor of claim 3 where said at least one single-axis radiation detector is a linear array charge coupled device.

7. The vehicle alignment sensor of claim 3 further including:

a fourth radiation emitter mounted to said housing in a second known, fixed relationship to said pair of emitters, said fourth radiation emitter and said pair of radiation emitters defining a second plane;

said single-axis radiation detector field of view includes said pair of radiation emitters and said fourth-radiation emitter; and wherein said single-axis radiation detector is displaced from said housing such that single-axis apparent displacement in said radiation detector field of view, of said fourth emitter from said pair of emitters varies from said second known relationship in trigonometric relation to a second alignment angle.

8. The vehicle alignment sensor of claim 7 wherein said second plane is substantially perpendicular to said first plane.

* * * * *